US012523846B1

(12) United States Patent
Hollands et al.

(10) Patent No.: US 12,523,846 B1
(45) Date of Patent: Jan. 13, 2026

(54) MEASURING OPTICAL POWER OF A LENS USING A VARIABLE FOCUS CAMERA

(71) Applicant: Apple Inc., Cupertino, CA (US)

(72) Inventors: Matthew D Hollands, Cambridge (GB); James E Pedder, Oxon (GB)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 18/611,106

(22) Filed: Mar. 20, 2024

Related U.S. Application Data

(60) Provisional application No. 63/498,237, filed on Apr. 25, 2023.

(51) Int. Cl.
*G02B 7/36* (2021.01)
*G01M 11/02* (2006.01)
*G06T 7/00* (2017.01)
*H04N 23/67* (2023.01)

(52) U.S. Cl.
CPC ........... *G02B 7/36* (2013.01); *G01M 11/0228* (2013.01); *G06T 7/97* (2017.01); *H04N 23/67* (2023.01); *G06T 2207/10148* (2013.01)

(58) Field of Classification Search
CPC ........ G02B 7/36; G01M 11/0228; G06T 7/97; G06T 2207/10148; H04N 23/67
See application file for complete search history.

(56) References Cited

U.S. PATENT DOCUMENTS

| | | | |
|---|---|---|---|
| 10,036,685 B2 | 7/2018 | Goldberg et al. | |
| 10,292,583 B2 | 5/2019 | Zhou | |
| 10,330,566 B2 | 6/2019 | Hofmann et al. | |
| 2017/0245758 A1 | 8/2017 | Liang | |
| 2018/0038768 A1* | 2/2018 | Hofmann | G01M 11/0264 |
| 2021/0093197 A1 | 4/2021 | Seriani | |
| 2022/0061661 A1* | 3/2022 | Obama | A61B 3/16 |
| 2024/0302657 A1* | 9/2024 | Pedder | G02B 27/0093 |

* cited by examiner

*Primary Examiner* — Gevell V Selby
(74) *Attorney, Agent, or Firm* — Treyz Law Group, P.C.; Joseph F. Guihan

(57) ABSTRACT

An electronic device may include a variable focus camera that is used during lens measurement operations. During the lens measurement operations, the variable focus camera may capture images of one or more targets with and without an intervening lens. Focus information obtained by the variable focus camera may be used to determine the spherical power, the cylindrical power, and the cylindrical axis of the lens. The focus information may be obtained using a frequency sweep while capturing images of a single target. Alternatively, the focus information may be obtained by performing autofocus operations while focusing on different targets. Based on the determined spherical power, cylindrical power, and cylindrical axis of the lens, the electronic device may output lens information using a display, a speaker, or communications circuitry.

20 Claims, 11 Drawing Sheets

$$\phi = \frac{1}{2}\tan^{-1}(2\frac{P_3 - P_1}{P_2 - P_1} - 1)$$

FIG. 9A

$$C = \frac{P_2 - P_1}{\cos(2\phi)}$$

FIG. 9B

$$S = \frac{P_1 + P_2 - C}{2}$$

FIG. 9C

MEASURING OPTICAL POWER OF A LENS USING A VARIABLE FOCUS CAMERA

This application claims the benefit of U.S. provisional patent application No. 63/498,237 filed Apr. 25, 2023, which is hereby incorporated by reference herein in its entirety.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Head-mounted devices typically include lenses with fixed shapes and properties. If care is not taken, it may be difficult to adjust these types of lenses to optimally present content to each user of the head-mounted device.

SUMMARY

A method of operating an electronic device with a variable focus camera may include capturing at least a first image of at least one target while a lens is interposed between the variable focus camera and a target, determining first optical power information for the lens based on the at least first image, capturing at least a second image of the at least one target while the lens is not interposed between the variable focus camera and a target, determining second optical power information for the lens based on the at least second image, and determining a spherical power, a cylindrical power, and a cylindrical axis for the lens using the first optical power information and the second optical power information.

A method of operating an electronic device with a variable focus camera may include capturing at least one image of at least one target through a lens using the variable focus camera, determining a first optimal optical power associated with a first meridian, a second optimal optical power associated with a second meridian, and a third optimal optical power associated with a third meridian using the at least one image of the at least one target, and determining a spherical power, a cylindrical power, and a cylindrical axis for the lens using the first, second, and third optimal optical powers.

An electronic device may include a display, a speaker, a variable focus camera, and control circuitry configured to use the variable focus camera to capture at least one image through an external lens, determine a spherical power, a cylindrical power, and a cylindrical axis for the lens using the at least one image, and output lens information based on the spherical power, the cylindrical power, and the cylindrical axis using at least one of the display and the speaker.

BRIEF DESCRIPTION OF THE DRAWINGS

FIG. 9A is an illustrative equation that may be used to determine the cylindrical axis of a lens in accordance with some embodiments.

FIG. 9B is an illustrative equation that may be used to determine the cylindrical power of a lens in accordance with some embodiments.

FIG. 9C is an illustrative equation that may be used to determine the spherical power of a lens in accordance with some embodiments.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

Figure 1:
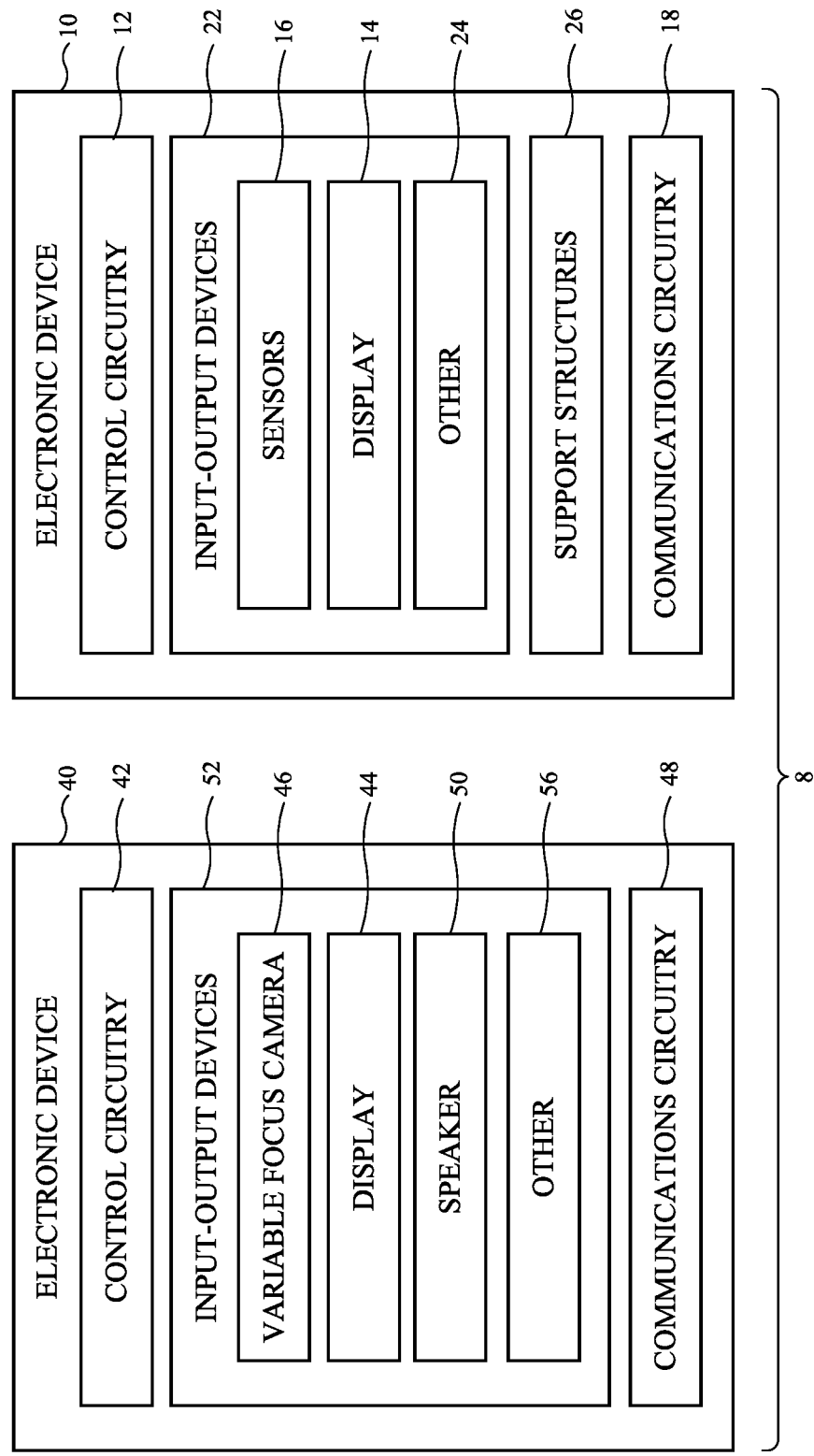
FIG. 1 is a schematic diagram of an illustrative system with a head-mounted device and an electronic device with a variable focus camera in accordance with some embodiments.

A schematic diagram of an illustrative system having an electronic device with a lens module and an electronic device with a variable focus camera is shown in FIG. 1. As shown in FIG. 1, system 8 may include one or more electronic devices such as electronic device 10 and electronic device 40. The electronic devices of system 8 may include computers, cellular telephones, tablet computers, laptop computers, head-mounted devices, wristwatch devices, and other electronic devices. Configurations in which electronic device 10 is a head-mounted device and electronic device 40 is a cellular telephone are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of components using control signals, etc.).

Electronic device 10 may include communication circuitry 18 (which may be considered part of control circuitry 12). The communication circuitry 18 may include wired and wireless communications circuitry and may include radio-frequency transceiver circuitry such as cellular telephone transceiver circuitry, wireless local area network (WiFi®) transceiver circuitry, millimeter wave transceiver circuitry, and/or other wireless communications circuitry.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may optionally include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes. The example of device 10 including a display is merely illustrative and display(s) 14 may be omitted from device 10 if desired. Device 10 may include an optical pass-through area where real-world content is viewable to the user either directly or through a tunable lens.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

As shown in FIG. 1, electronic device 40 may have control circuitry 42. Control circuitry 42 may include storage and processing circuitry for controlling the operation of device 40. Circuitry 42 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 42 may be based on one or more microprocessors, microcontrollers, digital signal processors, baseband processors, power management units, audio chips, graphics processing units, application specific integrated circuits, and other integrated circuits. Software code may be stored on storage in circuitry 42 and run on processing circuitry in circuitry 42 to implement control operations for device 40 (e.g., data gathering operations, lens measurement operations, operations involving the adjustment of components using control signals, etc.).

Electronic device 40 may include communication circuitry 48 (which may be considered part of control circuitry 42). The communication circuitry 48 may include wired and wireless communications circuitry and may include radio-frequency transceiver circuitry such as cellular telephone transceiver circuitry, wireless local area network (WiFi®) transceiver circuitry, millimeter wave transceiver circuitry, and/or other wireless communications circuitry.

Device 40 may include input-output devices 52. Input-output devices 52 may be used to allow a user to provide device 40 with user input. Input-output devices 52 may also be used to gather information on the environment in which device 40 is operating. Output components in devices 52 may allow device 40 to provide a user with output and may be used to communicate with external electrical equipment.

As shown in FIG. 1, input-output devices 52 may include one or more displays such as display 44. Display 44 may be an organic light-emitting diode display or other display based on arrays of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other suitable displays.

Input-output devices 52 may include a speaker 50 such as an ear speaker for producing audio output.

Input-output devices 52 may include a variable focus camera 46 (sometimes referred to as camera 46). The variable focus camera may include a moveable lens and/or a variable optical component (e.g., with one or more surfaces that changes curvature). The variable optical component may include a liquid-filled tunable lens, a liquid crystal lens that modulates refractive index, a polymer membrane, and/or any other desired components. Variable focus camera 46 may include focus pixels. The focus pixels may detect if an image is in focus. If the image is not in focus, the focus pixels may gather information that is indicative of how to adjust a lens in the variable focus camera 46 to bring the image into focus. During autofocus operations, information from one or more focus pixels in variable focus camera 46 may be used to focus camera 46 on a target.

If desired, input-output devices 52 may include other devices 56 such as haptic output devices (e.g., vibrating components), light-emitting diodes and other light sources, and other electrical components. Device 40 may include circuits for receiving wireless power, circuits for transmitting power wirelessly to other devices, batteries and other energy storage devices (e.g., capacitors), joysticks, buttons, and/or other components. Electronic device 40 may include one or more sensors (e.g., any of sensors 16 as described above in connection with electronic device 10).

In the event that electronic device 40 is a cellular telephone or a tablet computer, electronic device 40 may have a housing and display 14 may form a front face of the electronic device within the housing. In the event that electronic device 40 is a watch, electronic device 40 may have a housing, display 14 may form a front face of the electronic device within the housing, and a wristwatch strap may extend from first and second opposing sides of the housing. In the event that electronic device 40 is a laptop computer, electronic device 40 may have a lower housing with a keyboard and/or touchpad and an upper housing with a display. The lower housing and the upper housing may be coupled at a hinge such that the upper housing rotates relative to the lower housing to open and close the laptop computer.

During operation, the communications circuitry of the devices in system 8 (e.g., communications circuitry 18 of device 10 and communication circuitry 48 of device 40) may be used to support communication between the electronic devices. For example, one electronic device may transmit video, audio, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by devices 10 and/or 40 from external equipment (e.g., a tethered computer, a portable device such as a handheld device or laptop computer, online computing equipment such as a remote server or other remote computing equipment, or other electrical equipment) and/or to provide data to external equipment.

Figure 2:
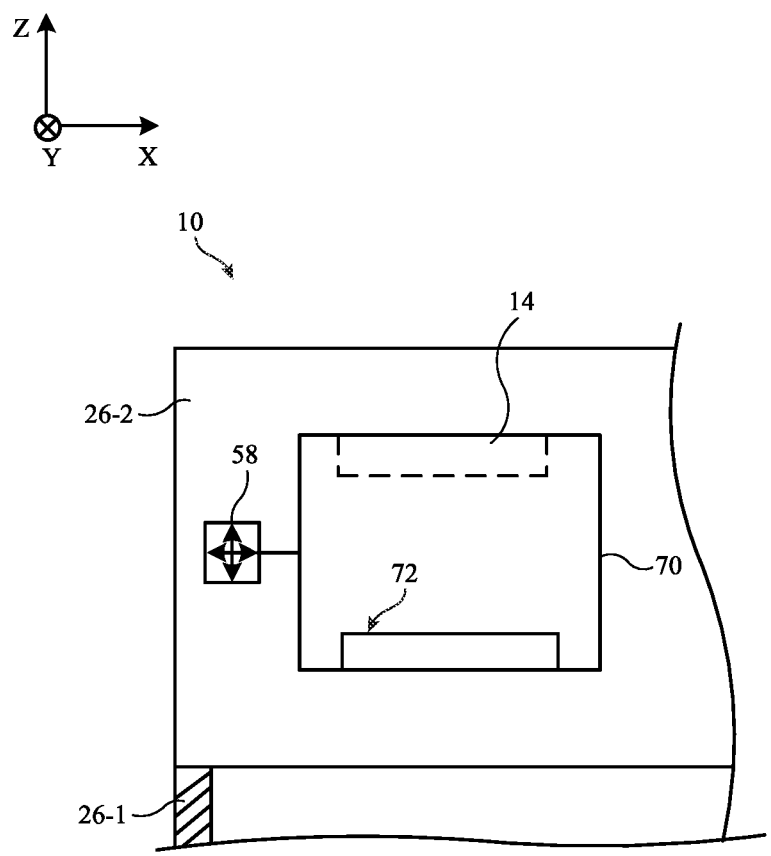
FIG. 2 is a top view of an illustrative head-mounted device with a lens module in accordance with some embodiments.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures, etc.) and eyeglass temples or other supplemental support structures such as structures 26-1 that help to hold main unit 26-2 on a user's face.

The electronic device may include optical modules such as optical module 70. The electronic device may include left and right optical modules that correspond respectively to a user's left eye and right eye. An optical module corresponding to the user's left eye is shown in FIG. 2.

Each optical module 70 includes a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light (e.g., from a display or from the physical environment) in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays, the optical modules 70, and/or lens modules 72. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance IPD of a user's eyes. In another example, the lens module may include an adjustable lens element. The curvature of the adjustable lens element may be adjusted in real time by positioner(s) 58 to compensate for a user's eyesight, as one example.

Each optical module may optionally include a display such as display 14 in FIG. 2. As previously mentioned, the displays may be omitted from device 10 if desired. In this type of arrangement, the device may still include one or more lens modules 72 (e.g., through which the user views the real world). In this type of arrangement, real-world content may be selectively focused for a user.

Figure 3:
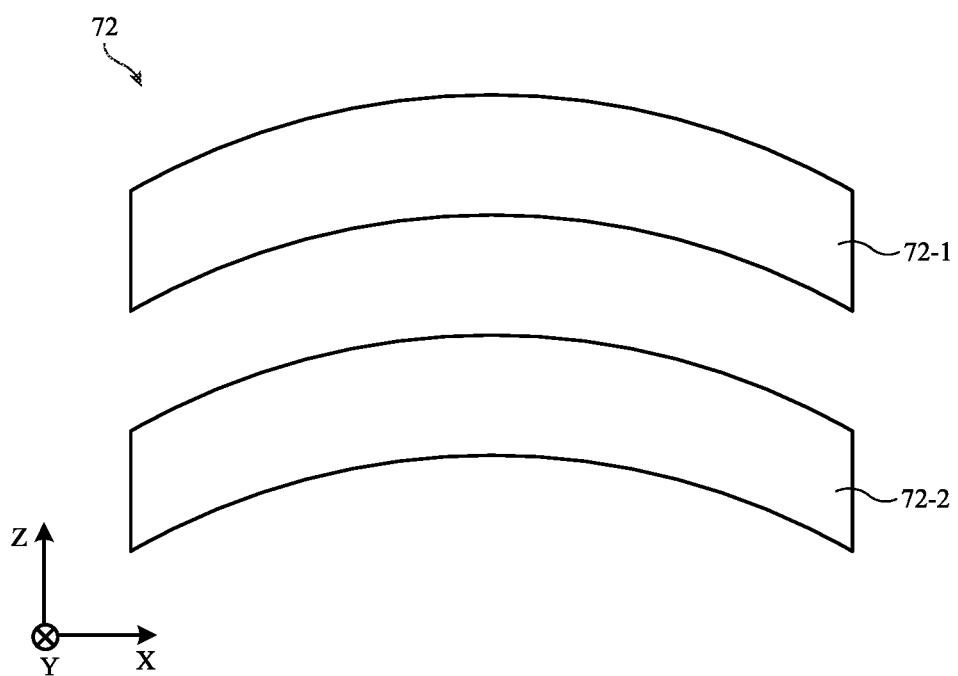
FIG. 3 is a side view of an illustrative lens module in accordance with some embodiments.

FIG. 3 is a cross-sectional side view of an illustrative lens module with multiple lens elements. As shown, lens module 72 includes a first lens element 72-1 and a second lens element 72-2. Each surface of the lens elements may have any desired curvature. For example, each surface may be a convex surface (e.g., a spherically convex surface, a cylindrically convex surface, or an aspherically convex surface), a concave surface (e.g., a spherically concave surface, a cylindrically concave surface, or an aspherically concave surface), a combination of convex and concave surfaces, or a freeform surface. A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. A freeform surface may include both convex and concave portions and/or curvatures defined by polynomial series and expansions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface. In one example, shown in FIG. 3, lens element 72-1 has a convex surface that faces display 14 and an opposing concave surface. Lens element 72-2 has a convex surface that faces lens element 72-1 and an opposing concave surface.

One or both of lens elements 72-1 and 72-2 may be adjustable. In one example, lens element 72-1 is a non-adjustable lens element whereas lens element 72-2 is an adjustable lens element. The adjustable lens element 72-2 may be used to accommodate a user's eyeglass prescription, for example. The shape of lens element 72-2 may be adjusted if a user's eyeglass prescription changes (without needing to replace any of the other components within device 10). As another possible use case, a first user with a first eyeglass prescription (or no eyeglass prescription) may use device 10 with lens element 72-2 having a first shape and a second, different user with a second eyeglass prescription may use device 10 with lens element 72-2 having a second shape that is different than the first shape. Lens element 72-2 may have varying lens power and/or may provide varying amounts and orientations of astigmatism correction to provide prescription correction for the user.

The example of lens module 72 including two lens elements is merely illustrative. In general, lens module 72 may include any desired number of lens elements (e.g., one, two, three, four, more than four, etc.). Any subset or all of the lens elements may optionally be adjustable. Any of the adjustable lens elements in the lens module may optionally be fluid-filled adjustable lenses. Lens module 72 may also include any desired additional optical layers (e.g., partially reflective mirrors that reflect 50% of incident light, linear polarizers, retarders such as quarter wave plates, reflective polarizers, circular polarizers, reflective circular polarizers, etc.) to manipulate light that passes through lens module.

In one possible arrangement, lens element 72-1 may be a removable lens element. In other words, a user may be able to easily remove and replace lens element 72-1 within optical module 70. This may allow lens element 72-1 to be customizable. If lens element 72-1 is permanently affixed to the lens assembly, the lens power provided by lens element 72-1 cannot be easily changed. However, by making lens element 72-1 customizable, a user may select a lens element 72-1 that best suits their eyes and place the appropriate lens element 72-1 in the lens assembly. The lens element 72-1 may be used to accommodate a user's eyeglass prescription, for example. A user may replace lens element 72-1 with an updated lens element if their eyeglass prescription changes (without needing to replace any of the other components within electronic device 10). Lens element 72-1 may have varying lens power and/or may provide varying amount of astigmatism correction to provide prescription correction for the user. Lens element 72-1 may include one or more attachment structures that are configured to attach to corresponding attachment structures included in optical module 70, lens element 72-2, support structures 26, or another structure in electronic device 10.

In contrast with lens element 72-1, lens element 72-2 may not be a removable lens element. Lens element 72-2 may therefore sometimes be referred to as a permanent lens element, non-removable lens element, etc. The example of lens element 72-2 being a non-removable lens element is merely illustrative. In another possible arrangement, lens element 72-2 may also be a removable lens element (similar to lens element 72-1).

As previously mentioned, one or more of the adjustable lens elements may be a fluid-filled lens element. An example is described herein where lens element 72-2 from FIG. 3 is a fluid-filled lens element. When lens element 72-2 is a fluid-filled lens element, the lens element may include one or more components that define the surfaces of lens element 72-2. These elements may also be referred to as lens elements. In other words, adjustable lens element 72-2 (sometimes referred to as adjustable lens module 72-2, adjustable lens 72-2, tunable lens 72-2, etc.) may be formed by multiple respective lens elements.

Figure 4:
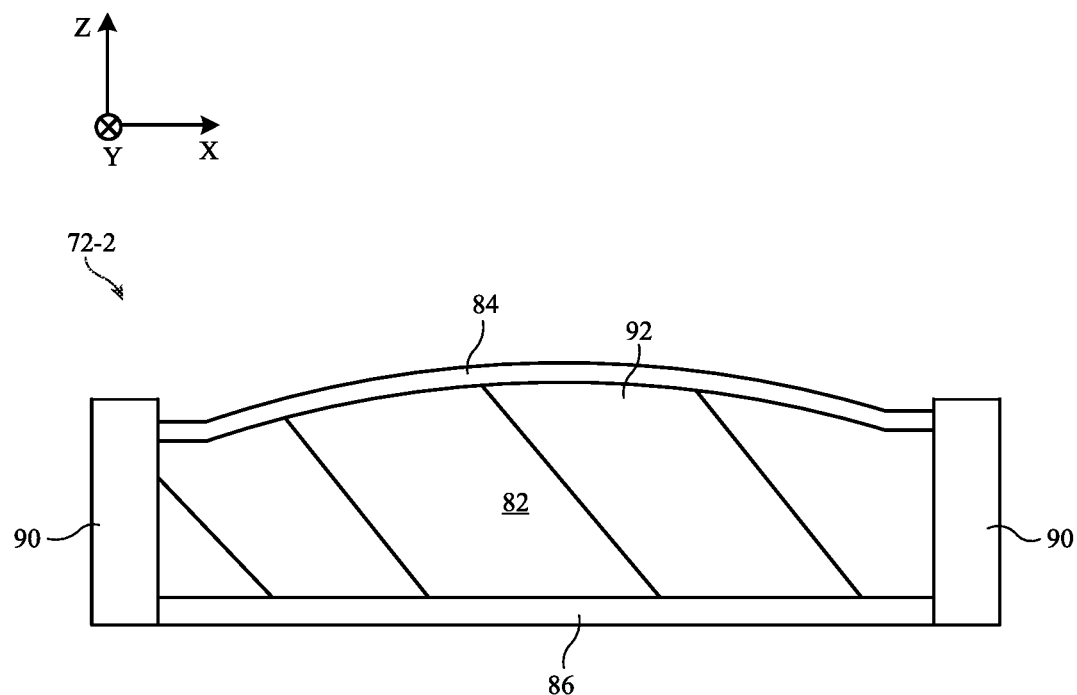
FIGS. 4 and 5 are side views of an illustrative tunable lens in different tuning states in accordance with some embodiments.

FIG. 4 is a cross-sectional side view of adjustable fluid-filled lens element 72-2. As shown, fluid-filled chamber 82 (sometimes referred to as chamber 82 or fluid chamber 82) that includes fluid 92 is interposed between lens elements 84 and 86. Fluid 92 may be a liquid, gel, or gas with a pre-determined index of refraction (and may therefore sometimes be referred to as liquid 92, gel 92, or gas 92). The fluid may sometimes be referred to as an index-matching oil, an optical oil, an optical fluid, an index-matching material, an index-matching liquid, etc. Lens elements 84 and 86 may have the same index of refraction or may have different indices of refraction. Fluid 92 that fills chamber 82 between lens elements 84 and 86 may have an index of refraction that is the same as the index of refraction of lens element 84 but different from the index of refraction of lens element 86, may have an index of refraction that is the same as the index of refraction of lens element 86 but different from the index of refraction of lens element 84, may have an index of refraction that is the same as the index of refraction of lens element 84 and lens element 86, or may have an index of refraction that is different from the index of refraction of lens element 84 and lens element 86. Lens elements 84 and 86 may have a circular footprint, may have an elliptical footprint, may have or may have a footprint any another desired shape (e.g., an irregular footprint).

The amount of fluid 92 in chamber 82 may have a constant volume or an adjustable volume. If the amount of fluid is adjustable, the lens module may also include a fluid reservoir and a fluid controlling component (e.g., a pump, stepper motor, piezoelectric actuator, motor, linear electromagnetic actuator, and/or other electronic component that applies a force to the fluid in the fluid reservoir) for selectively transferring fluid between the fluid reservoir and the chamber.

Lens elements 84 and 86 may be transparent lens elements formed from any desired material (e.g., glass, a polymer material such as polycarbonate or acrylic, a crystal such as sapphire, etc.). Each one of lens elements 84 and 86 may be elastomeric, semi-rigid, or rigid. Elastomeric lens elements may be formed from a natural or synthetic polymer that has a low Young's modulus for high flexibility. For example the elastomeric membrane may be formed from a material having a Young's modulus of less than 1 GPa, less than 0.5 GPa, less than 0.1 GPa, etc.

Semi-rigid lens elements may be formed from a semi-rigid material that is stiff and solid, but not inflexible. A semi-rigid lens element may, for example, be formed from a thin layer of polymer or glass. Semi-rigid lens elements may be formed from a material having a Young's modulus that is greater than 1 Gpa, greater than 2 GPa, greater than 3 GPa, greater than 10 GPa, greater than 25 GPa, etc. Semi-rigid lens elements may be formed from polycarbonate, polyethylene terephthalate (PET), polymethylmethacrylate (PMMA), acrylic, glass, or any other desired material. The properties of semi-rigid lens elements may result in the lens element becoming rigid along a first axis when the lens element is curved along a second axis perpendicular to the first axis or, more generally, for the product of the curvature along its two principal axes of curvature to remain roughly constant as it flexes. This is in contrast to an elastomeric lens element, which remains flexible along a first axis even when the lens element is curved along a second axis perpendicular to the first axis. The properties of semi-rigid lens elements may allow the semi-rigid lens elements to form a cylindrical lens with tunable lens power and a tunable axis.

Rigid lens elements may be formed from glass, a polymer material such as polycarbonate or acrylic, a crystal such as sapphire, etc. In general, the rigid lens elements may not deform when pressure is applied to the lens elements within the lens module. In other words, the shape and position of the rigid lens elements may be fixed. Each surface of a rigid lens element may be planar, concave (e.g., spherically, aspherically, or cylindrically concave), or convex (e.g., spherically, aspherically, or cylindrically convex). Rigid lens elements may be formed from a material having a Young's modulus that is greater than greater than 25 GPa, greater than 30 GPa, greater than 40 GPa, greater than 50 GPa, etc.

One or more structures such as a lens housing 90 (sometimes referred to as housing 90, lens chassis 90, chassis 90, support structure 90, etc.) may also define the fluid-filled chamber 82 of lens element 72-2.

Figure 5:
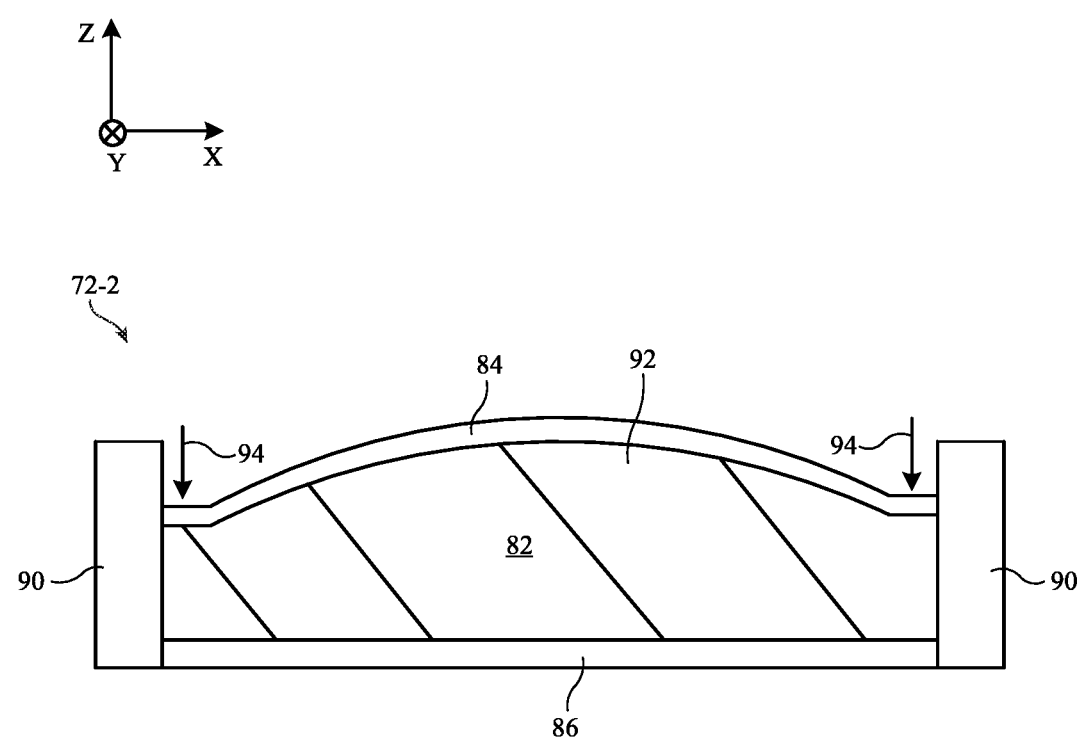

FIG. 5 is a cross-sectional side view of lens element 72-2 showing an illustrative adjustment of the shape of lens element 72-2. As shown, during adjustments of lens element 72-2, lens element 84 may be biased in direction 94 at multiple points along its periphery (e.g., a point force is applied in direction 94 at multiple points). In this way, the curvature of the lens element 84 (and accordingly, the lens power of lens element 72-2) may be adjusted.

There are multiple options for how to manipulate the shape of lens element 84. In one possible arrangement, a plurality of actuators (e.g., linear actuators) may be coupled to the periphery of the lens element. The actuators may be distributed evenly around the periphery of the lens element 84, as one example. Each actuator (e.g., a linear actuator) may be coupled to a respective portion of lens element 84 and may selectively move that respective portion of lens element 84 up and down (e.g., in the Z-direction in FIGS. 4 and 5) to control the position of that respective portion of lens element 84 in the Z-direction. A lens shaping element (e.g., a ring-shaped element) may optionally be coupled to both lens element 84 and the actuators.

It may be desirable to adjust adjustable lens module 72 to compensate for a user's eyesight. For example, tunable lens 72-2 may be adjusted to compensate for the user's eyesight. As another example, a removable lens element 72-1 may be selected that best suits the user's eyesight.

One way to compensate for a user's eyesight is for the user to manually enter their eyeglasses prescription. In another possible arrangement, the user may measure one or more lenses in their eyeglasses to determine their eyeglasses prescription.

A technique is described herein for measuring the optical power of a lens using a variable focus camera. This technique may be used to measure the optical power of a lens in eyeglasses. The measured optical power may be used to determine a user's eyeglass prescription, to determine an amount to adjust a tunable lens in electronic device 10, and/or to select a removable lens element for electronic device 10.

Figure 6A:
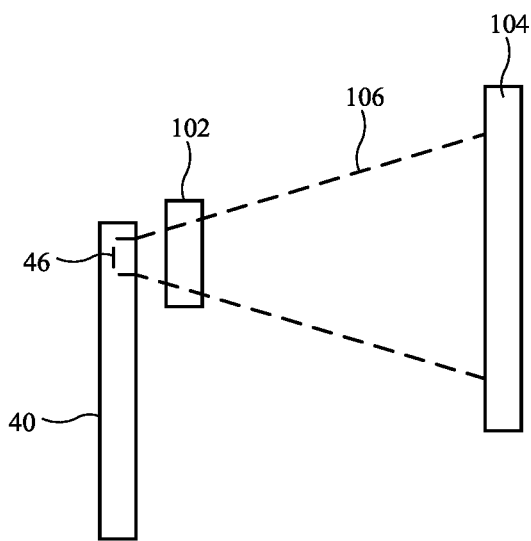
FIG. 6A is a diagram of an illustrative electronic device with a variable focus camera that captures images of a target through a lens during lens measurement operations in accordance with some embodiments.

FIG. 6A shows a side view of an illustrative system with electronic device 40, a lens 102, and a target 104. Electronic device 40 includes a variable focus camera 46 with a field-of-view 106. As shown, the field-of-view 106 is positioned to capture images of target 104 through lens 102. Lens 102 may be any desirable type of lens such as an eyeglass lens. However, it is noted that lens 102 is an external lens that is not a part of electronic device 40 (e.g., the lens 102 is not part of variable focus camera 46). The images captured by variable focus camera 46 through lens 102 may be used to measure characteristics of lens 102 (e.g., spherical power, cylindrical power, and/or cylindrical axis) during lens measurement operations.

It is noted that the example in FIG. 6A of the field-of-view 106 passing entirely through lens 102 is merely illustrative. If desired, lens 102 may only partially cover field-of-view 106. Only partially covering field-of-view 106 with lens 102 may be advantageous in measuring prism and/or ensuring correct alignment between the components.

Figure 6B:
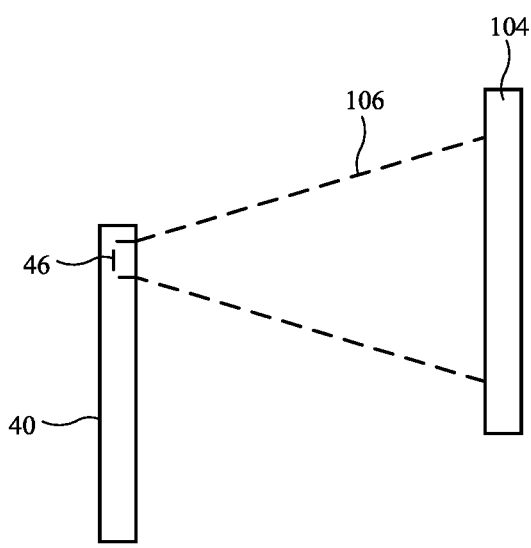
FIG. 6B is a diagram of the illustrative electronic device of FIG. 6A capturing images of the target without an intervening lens during lens measurement operations in accordance with some embodiments.

As shown in FIG. 6B, variable focus camera 46 may also capture images of target 104 without the intervening lens 102. These images may provide baseline information that is used to determine the optical power provided by lens 102.

To determine the optical power of lens 102, electronic device 40 may use variable focus camera 46 to determine an optimal focus for each one of three meridians. The meridians may be at respective angles of 0 degrees, 90 degrees, and 135 degrees, as a first example. In general, meridians at any desired angles may be used.

In one example, the optimal focus for the three meridians may be determined using images of a single target. Consider the target of FIG. 7 as an example. The target of FIG. 7 includes a plurality of concentric black and white rings. These rings have rotational symmetry, which is useful in mitigating artifacts caused by incidental rotations of camera 46 during operation of device 40. Additional rings of smaller sizes may overlap the main rings. Including additional rings (e.g., along meridians that are not analyzed) may boost the frequency content in the meridians that are analyzed. The arrangement of FIG. 7 may boost the frequency content along a horizontal axis through the center of the target (e.g., a 0 degree meridian) and may boost the frequency content along a vertical axis through the center of the target (e.g., a 90 degree meridian).

Figure 7:
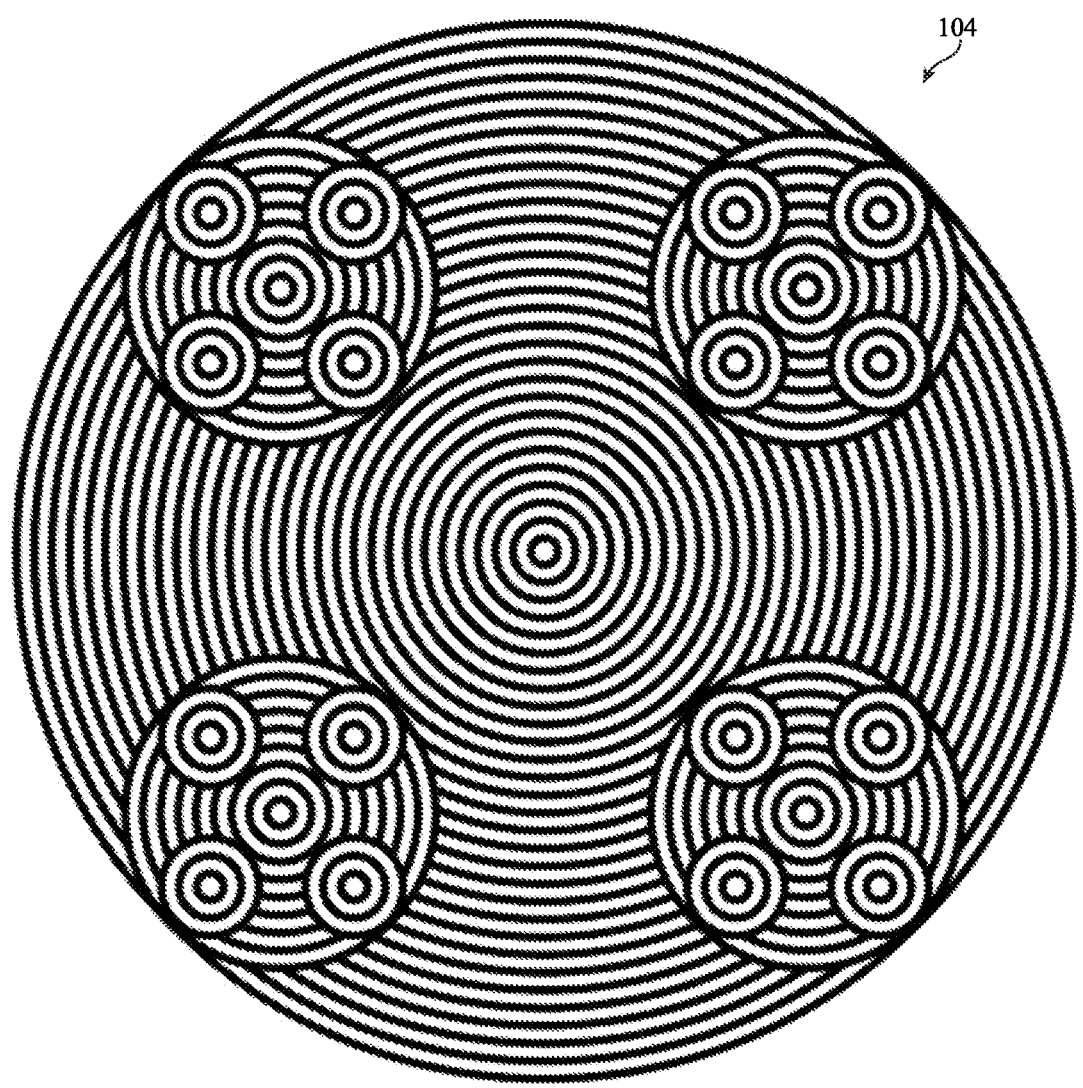
FIG. 7 is a top view of an illustrative target that may be used during lens measurement operations in accordance with some embodiments.

The example of the target in FIG. 7 is merely illustrative. In general, the target may have any desired shapes/arrangement.

The example of using a target with one or more elements (e.g., rings) having rotational symmetry as in FIG. 7 is merely illustrative. Instead or in addition, relative rotation of the target may be determined (e.g., using accelerometers in device 40 and/or image processing) and compensated for accordingly.

Figure 8:
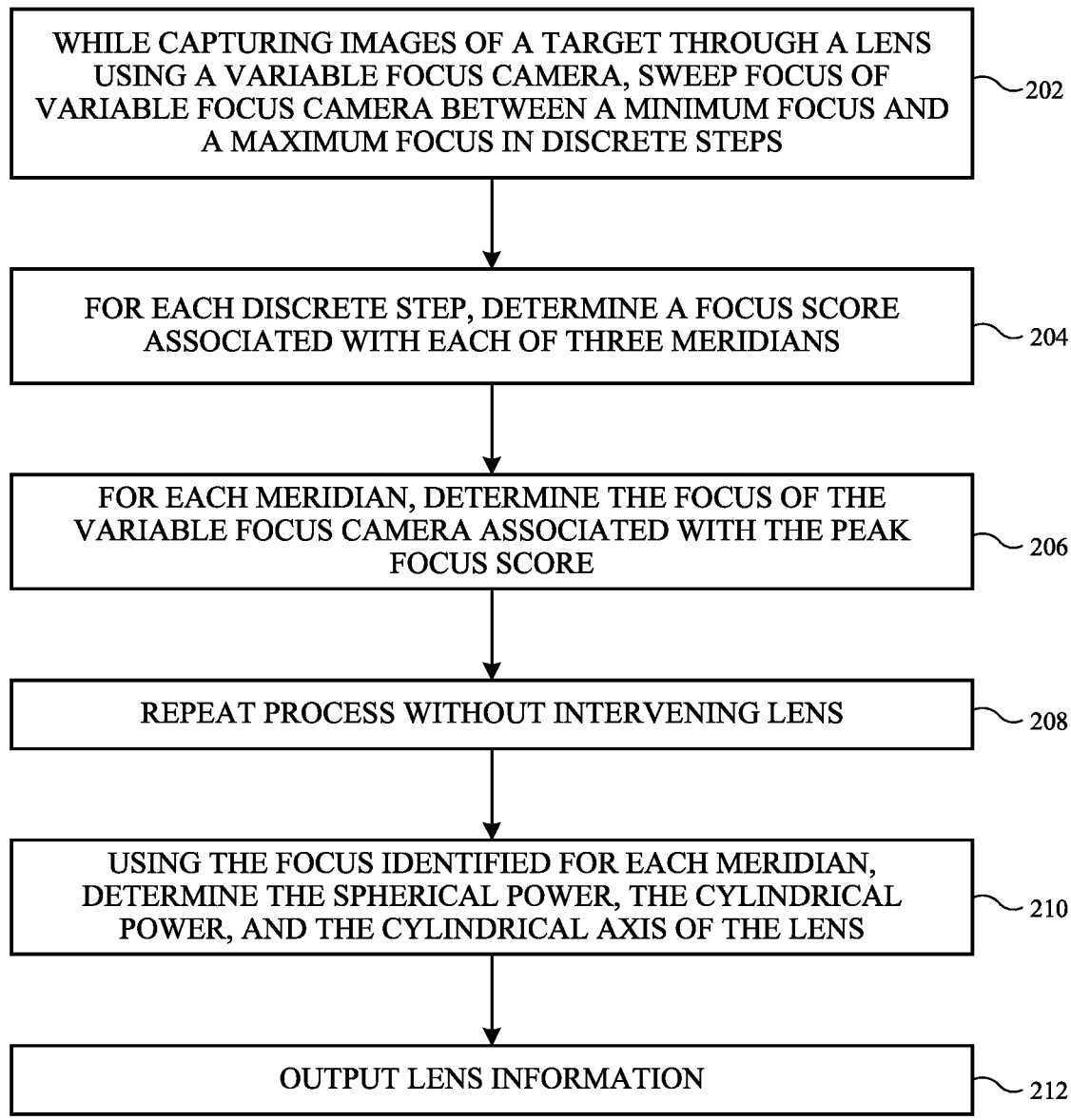
FIG. 8 is a flowchart of illustrative method steps for measuring lens information using a single target and a focus sweep of a variable focus camera in accordance with some embodiments.

FIG. 8 is a flowchart of illustrative method steps for determining optical power information for a lens using a variable focus camera and a single target (such as the target of FIG. 7). First, at step 202, variable focus camera 46 captures images of a target (such as target 104) through a lens. The lens may be an eyeglass lens or any other desired lens. While the variable focus camera 46 captures images, the focus of the variable focus camera may be swept between a minimum focus and a maximum focus in discrete steps. The variable focus camera may have a minimum associated optical power (sometimes referred to as the minimum focus) and a maximum associated optical power (sometimes referred to as the maximum focus). There may be any desired interval between each step.

At step 204, a focus score may be determined (e.g., by control circuitry 42 in device 40) for each of at least three meridians at each discrete step of the focus sweep. The focus score may be determined by taking a fast Fourier transform (FFT), multiplying by weights (with higher frequencies having higher weights), and summing. This type of procedure quantifies the level of focus for the image captured by camera 46. The example of using a FFT to determine the focus score is merely illustrative. In general, any desired technique for characterizing focus may be used to determine the focus score. A higher focus score indicates a more focused (e.g., clear) image whereas a lower focus score indicates a less focused (e.g., blurry) image.

At step 206, control circuitry 42 in device 40 may, for each meridian, determine the focus of the variable focus camera associated with the peak focus score. For example, a first optical power $P_{1L}$ may be the optical power with a peak focus score along a meridian of 0 degrees, a second optical power $P_{2L}$ may be the optical power with a peak focus score along a meridian of 90 degrees, and a third optical power $P_{3L}$ may be the optical power with a peak focus score along a meridian of 135 degrees.

At step 208, the process of steps 202-206 may be repeated without an intervening lens. In other words, variable focus camera 46 captures images of a target (such as target 104) without intervening lens 102. Steps 204 and 206 are then repeated to determine the optical power with a peak focus score along three different meridians. For example, a first optical power $P_{1N}$ may be the optical power with a peak focus score along a meridian of 0 degrees, a second optical power $P_{2N}$ may be the optical power with a peak focus score along a meridian of 90 degrees, and a third optical power $P_{3N}$ may be the optical power with a peak focus score along a meridian of 135 degrees.

At step 210, the optical powers identified for each meridian in steps 206 and 208 (both with and without an intervening lens 102) may be used to determine the spherical power, the cylindrical power, and the cylindrical axis of the lens 102. A difference between the optical powers for each meridian with and without the lens may be determined (e.g., $P_1 = P_{1N} - P_{1L}$, $P_2 = P_{2N} - P_{2L}$, and $P_3 = P_{3B} - P_{3L}$). The cylindrical axis of lens 102 may be determined using the equation of FIG. 9A, where $\phi$ is equal to the cylindrical axis. The cylindrical power may be determined using the equation of FIG. 9B, where C is equal to the cylindrical power and $\phi$ is equal to the cylindrical axis. The spherical power may be determined using the equation of FIG. 9B, where S is equal to the spherical power and C is equal to the cylindrical power.

A best fit approximation may be performed during step 210 to minimize root mean squared error at the three meridians.

Moreover, it is noted that the example of using three meridians for steps 202-210 is merely illustrative. If desired, more than three meridians may be used for steps 202-210. In general, using additional meridians may improve the accuracy of the optical power measurement.

At step 212, electronic device 40 may output lens information using the characteristics of lens 102 determined at step 210. The lens information output at step 212 may include prescription information for lens 102. Instead or in addition, the lens information may include the identification of an appropriate removable lens for a head-mounted device such as head-mounted device 10. Instead or in addition, the lens information may include tuning information for a tunable lens in a head-mounted device such as head-mounted device 10. The information output at step 212 may be displayed on display 44, provided as audio feedback using speaker 50, and/or transmitted to one or more external devices such as electronic device 10 using communication circuitry 48.

In some cases, sweeping through the focus states of variable focus camera 46 (as in step 202) may take longer than desired. One way to speed up this process is to first perform steps 202-206 with a coarse interval between focus steps at step 202. After the coarse steps are used to determine an approximate peak focus score, steps 202-206 may be repeated using a fine interval between focus steps at step 202 (and a smaller total range of the focus sweep). The fine focus steps are then used to determine more accurate peak focus scores at steps 204 and 206. This type of arrangement may mitigate the total time spent to determine the desired lens information.

Figure 10A:
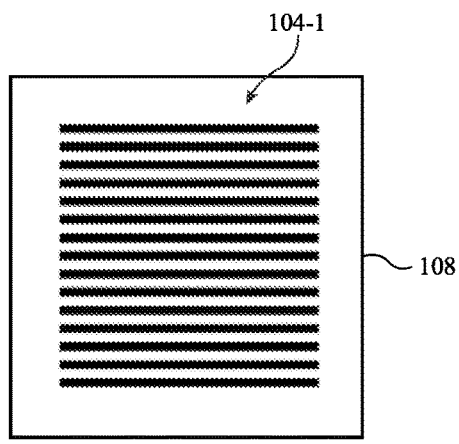
FIG. 10A is a top view of an illustrative target with horizontal stripes that is presented on a display in accordance with some embodiments.
Figure 10B:
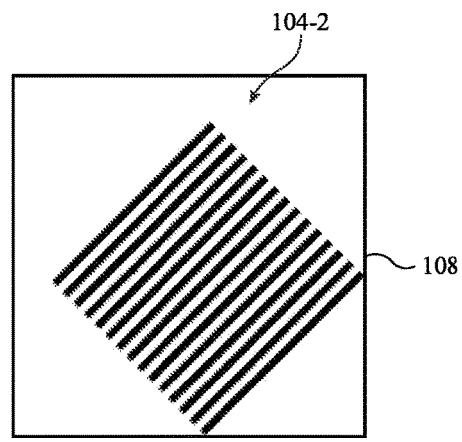
FIG. 10B is a top view of an illustrative target with diagonal stripes that is presented on the display of FIG. 10A in accordance with some embodiments.
Figure 10C:
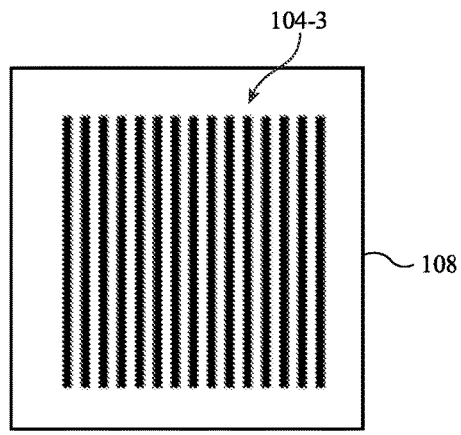
FIG. 10C is a top view of an illustrative target with vertical stripes that is presented on the display of FIG. 10A in accordance with some embodiments.
Figure 11:
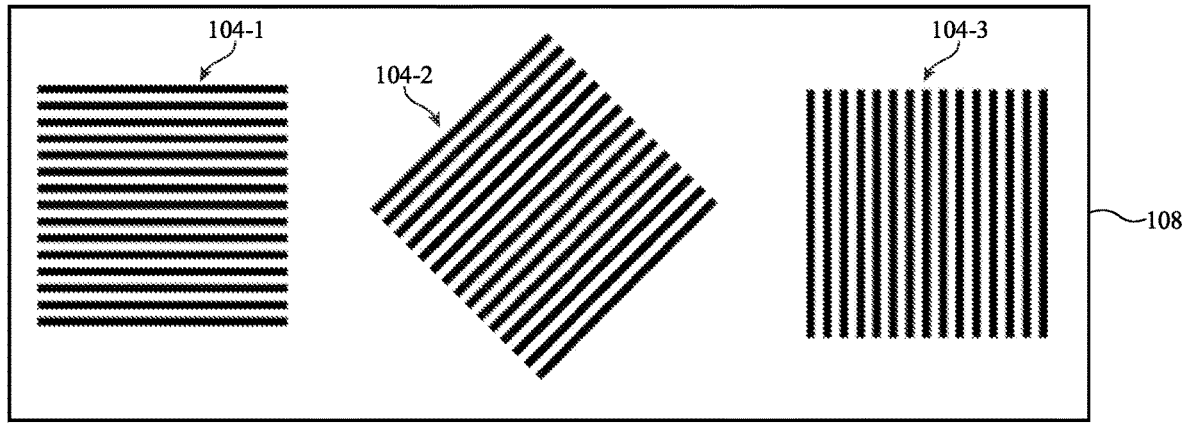
FIG. 11 is a top view of illustrative targets that are simultaneously presented on a display in accordance with some embodiments.

As yet another alternative, multiple targets may be used to determine the optimal focus along each meridian (instead of the single target as in FIGS. 7 and 8). An example of this type is shown in FIGS. 10-11. FIGS. 10A-10C show an external display 108 that may display targets that are used to measure lens information. At a first time, external display 108 displays target 104-1 with horizontal stripes (e.g., stripes used to measure focus for a first meridian at 90 degrees). At a second time, external display 108 displays target 104-2 with diagonal stripes (e.g., stripes used to measure focus for a second meridian at 135 degrees). At a third time, external display 108 displays target 104-3 with vertical stripes (e.g., stripes used to measure focus for a third meridian at 0 degrees).

When display 108 is displaying target 104-1, variable focus camera 46 may perform autofocus operations to focus on target 104-1. The optical power associated with the variable focus camera while focusing on target 104-1 may be considered equal to the optimal or peak optical power for the first meridian.

The autofocus operations may be performed using one or more focus pixels in variable focus camera. The focus pixels may be capable of detecting whether or not the image is focused properly and, if the image is not focused properly, how to adjust the camera lens to focus the image.

When the display 108 is displaying target 104-2, variable focus camera 46 may perform autofocus operations to focus on target 104-2. The optical power associated with the variable focus camera while focusing on target 104-2 may be considered equal to the optimal or peak optical power for the second meridian.

When the display 108 is displaying target 104-3, variable focus camera 46 may perform autofocus operations to focus on target 104-3. The optical power associated with the variable focus camera while focusing on target 104-3 may be considered equal to the optimal or peak optical power for the third meridian.

In other words, focusing on different targets with frequency content associated with different meridians may be used to determine the optimal optical powers for multiple meridians (as opposed to the focus sweep technique of FIGS. 7 and 8).

In the example of FIGS. 10A-10C, the targets are displayed in sequence on a single display 108. Electronic device 40 may communicate with display 108 to synchronize with display 108. Alternatively, electronic device 40 may use image processing to determine which target is being captured at a given point in time.

Instead of varying the target temporally (as in FIGS. 10A-10C), display 108 may display all three targets at the same time (as in FIG. 11). In this arrangement, electronic device 40 may first identify target 104-1 as the target for the autofocus operations of variable focus camera 46, may then identify target 104-2 as the target for the autofocus operations of variable focus camera 46, and then may identify target 104-3 as the target for the autofocus operations of variable focus camera 46.

Figure 12:
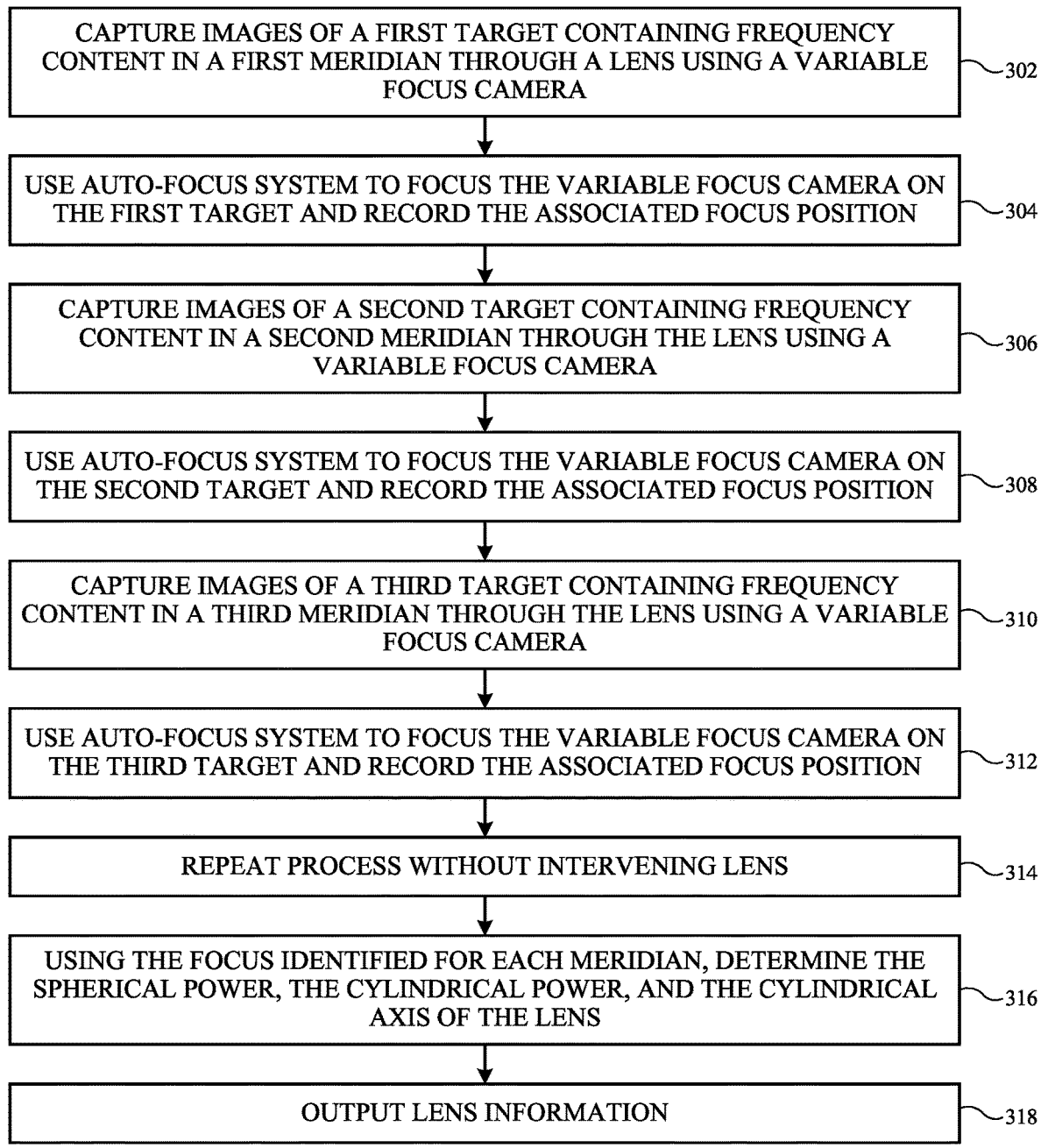
FIG. 12 is a flowchart of illustrative method steps for measuring lens information using multiple targets and autofocus operations in accordance with some embodiments.

FIG. 12 is a flowchart of illustrative method steps for determining optical power information for a lens using a variable focus camera and multiple targets that have different frequency content (such as the targets of FIGS. 10-11).

At step 302, variable focus camera 46 may capture, through a lens 102, images of a first target containing frequency content in a first meridian. For example, target 104-1 of FIG. 10A may be used at step 302. Electronic device 40 may communicate with a display 108 that displays target 104-1 to ensure synchronization between the captured images and the target.

Alternatively, electronic device 40 may use image processing to identify when target 104-1 is being displayed. As yet another alternative, a user may provide input (e.g., a button press, voice command) that identifies when images of target 104-1 are being captured.

At step 304, the variable focus camera may perform autofocus operations to focus on the first target. The focus position associated with the optimal focus (as determined using the autofocus operations) is recorded. For example, a first optical power $P_{1L}$ may be the optical power associated with the optimal focus of the autofocus operations when capturing images of target 104-1.

At step 306, variable focus camera 46 may capture, through a lens 102, images of a second target containing frequency content in a first meridian. For example, target 104-2 of FIG. 10B may be used at step 306. Electronic device 40 may communicate with a display 108 that displays target 104-2 to ensure synchronization between the captured images and the target. Alternatively, electronic device 40 may use image processing to identify when target 104-2 is being displayed. As yet another alternative, a user may provide input (e.g., a button press, voice command) that identifies when images of target 104-2 are being captured.

At step 308, the variable focus camera may perform autofocus operations to focus on the second target. The focus position associated with the optimal focus (as determined using the autofocus operations) is recorded. For example, a second optical power $P_{2L}$ may be the optical power associated with the optimal focus of the autofocus operations when capturing images of target 104-2.

At step 310, variable focus camera 46 may capture, through lens 102, images of a third target containing frequency content in a third meridian. For example, target 104-3 of FIG. 10C may be used at step 310. Electronic device 40 may communicate with a display 108 that displays target 104-3 to ensure synchronization between the captured images and the target. Alternatively, electronic device 40 may use image processing to identify when target 104-3 is being displayed. As yet another alternative, a user may provide input (e.g., a button press, voice command) that identifies when images of target 104-3 are being captured.

At step 312, the variable focus camera may perform autofocus operations to focus on the third target. The focus position associated with the optimal focus (as determined using the autofocus operations) is recorded. For example, a third optical power $P_{3L}$ may be the optical power associated with the optimal focus of the autofocus operations when capturing images of target 104-3.

At step 314, the process of steps 302-312 may be repeated without an intervening lens. In other words, variable focus camera 46 captures images of the targets 104-1, 104-2, and 104-3 without intervening lens 102. In steps 304, 308, and 312, the optical powers associated with the optimal focuses of the autofocus operations for the different targets are recorded. For example, a first optical power $P_{1N}$ may be associated with the optimal focus of the autofocus operations when capturing images of target 104-1, a second optical power $P_{2N}$ may be associated with the optimal focus of the autofocus operations when capturing images of target 104-2, and a third optical power $P_{3N}$ may be associated with the optimal focus of the autofocus operations when capturing images of target 104-3.

It is noted that the example of capturing images of first, second, and third targets in steps 302, 306, and 310 is merely illustrative. In another possible arrangement, target 104 continuously rotates over time. In other words, at a first time external display 108 initially displays target 104 with horizontal stripes. The target is then continuously rotated over time (reaching the arrangement of FIG. 10B at a second time subsequent to the first time and reaching the arrangement of FIG. 10C at a third time subsequent to the second time). Autofocus operations may be performed continuously as the target rotates over time, producing a more continuous plot of focal power versus the angle of the target.

At step 316, the optical powers identified for each meridian in steps 304, 308, and 312 (both with and without an intervening lens 102) may be used to determine the spherical power, the cylindrical power, and the cylindrical axis of the lens 102. A difference between the optical powers for each meridian with and without the lens may be determined (e.g., $P_1=P_{1N}-P_{1L}$, $P_2=P_{2N}-P_{2L}$, and $P_3=P_{3N}-P_{3L}$). The cylindrical axis of lens 102 may be determined using the equation of FIG. 9A, where o is equal to the cylindrical axis. The cylindrical power may be determined using the equation of FIG. 9B, where C is equal to the cylindrical power and o is equal to the cylindrical axis. The spherical power may be determined using the equation of FIG. 9B, where S is equal to the spherical power and C is equal to the cylindrical power.

A best fit approximation may be performed during step 316 to minimize root mean squared error at the three meridians.

Moreover, it is noted that the example of using three meridians for steps 302-316 is merely illustrative. If desired, more than three meridians may be used for steps 302-316. In general, using additional meridians may improve the accuracy of the optical power measurement. In the example where the target is continuously rotated, the optical powers identified across the entire range of angles of the target may be used to determine the spherical power, the cylindrical power, and the cylindrical axis of the lens 102.

At step 318, electronic device 40 may output lens information using the characteristics of lens 102 determined at step 316. The lens information output at step 318 may include prescription information for lens 102. Instead or in addition, the lens information may include the identification of an appropriate removable lens for a head-mounted device such as head-mounted device 10. Instead or in addition, the lens information may include tuning information for a tunable lens in a head-mounted device such as head-mounted device 10. The information output at lens information 318 may be displayed on display 44, provided as audio feedback using speaker 50, and/or transmitted to one or more external devices such as electronic device 10 using communication circuitry 48.

In some cases, variable focus camera 46 may have focus pixels that are configured to measure focus along three meridians. In this case, autofocus operations may be used with a single target to determine the optimal focus along the three meridians. Additionally, lens 102 may be measured without a specific target in this scenario (e.g., objects in the user's physical environment may be sufficient targets for the lens measurement operations).

In the methods of FIGS. 8 and 12, image processing may be performed during image capture to verify that the target is appropriately in view and has sufficient spectral content for the lens measurement operations. If the target is not properly in view or does not have sufficient spectral content, a notification may be presented to the user (e.g., using display 44 and/or speaker 50).

In the methods of FIGS. 8 and 12, the order of steps presented is merely illustrative. In general the steps may be performed in any desired order. For example, the baseline images (without an intervening lens) may be captured before the images with the intervening lens instead of after the images with the intervening lens (as in FIGS. 8 and 12).

Variable focus camera 46 may have a limited range of accommodation. The system may therefore sometimes not be able to properly focus through lenses of large optical power. Consider an example where a target is close to the camera (e.g., 30 cm). The autofocus system of variable focus camera 46 may need to provide +3 diopters of correction to focus on the target (even without intervening lens 102). If a −5 diopters lens 102 is tested, the autofocus system of variable focus camera 46 needs to provide +8 diopters of optical power to properly focus on the target through lens, which may be out of range. In this type of scenario, electronic device 40 may be able to detect that the autofocus system is at a limit and the image is not in focus. Electronic device 40 may correspondingly provide feedback (e.g., using display 44 and/or speaker 50) to move the target closer or further from the variable focus camera. Instead or in addition, electronic device 40 may provide a notification (e.g., using display 44 and/or speaker 50) that the tested lens 102 is outside a limit that can be properly tested. Instead or in addition, electronic device 40 may extrapolate the lens information using the captured data (even though a focused image is not obtained).

Image processing may be used by electronic device 40 to improve the lens measurements even when the lens is in range. For example, the autofocus system may achieve its best possible focus and then image processing may be used to estimate an error in the focus which improves the results of subsequent calculations.

A user interface may be presented on display 44 during the lens measurement operations of FIG. 8 or FIG. 12. The user interface may include a preview of the camera image (e.g., so that the user can align the target with the camera's field-of-view), one or more user interface buttons (e.g., to select a scan of the target with the lens or a scan of the target without the lens and/or to indicate the type of target being imaged), etc. The user interface may optionally include alignment features on display 44 so that the user can easily align the center of the target with the center of the camera.

In some cases, variable focus camera 46 uses lens displacement as a measurement of lens position and camera focus. Control circuitry 42 may convert the lens displacement to optical power (in diopters) using calibration data. The calibration may be performed during manufacturing or may be performed by a user before performing the lens measurement operations.

If desired, position and/or motion sensors in electronic device 40 (e.g., accelerometers) may be used to detect shaking during the measurement operations and/or shifts in the camera position between measurements. Depth sensors (e.g., LIDAR based depth sensors) may be used to ensure the target is approximately normal to the camera orientation. A gyroscope and/or compass may be used to ensure that variable focus camera 46 is vertical during the measurement operations. Image processing may be used to detect if the captured images are too dark, too bright, etc. If any of the aforementioned cases are detected, the affected frames may be discarded. The user may be prompted to retake one or more images if necessary.

Figure 13:
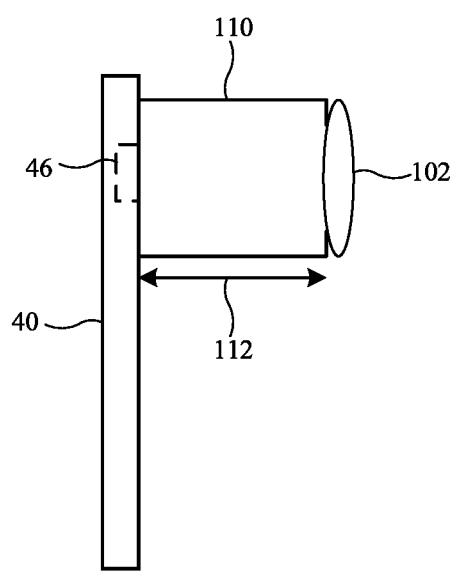
FIG. 13 is a side view of an illustrative spacer that may be interposed between the electronic device with the variable focus camera and the lens during lens measurement operations in accordance with some embodiments.

FIG. 13 shows how a spacer such as spacer 110 may be used to control the separation between variable focus camera 46 and lens 102 during the lens measurement operations. The spacer may have a known, optimal width 112 for the lens measurement operations. The spacer 110 may rest against device 40 and lens 102 may rest against spacer 110, thus ensuring a consistent spacing between lens 102 and electronic device 40.

Spacer 110 may have one or more attachment structures that attach the spacer to electronic device 40 and/or lens 102. The attachment structures may include magnets, protrusions, recesses, grooves, snaps, clips, etc. For example, a first magnet in spacer 110 may be configured to magnetically couple to a second magnet in electronic device 40. Spacer 110 may include one or more recesses that receive lens 102. Lens 102 may be aligned with camera 46 when spacer 110 is attached to both electronic device 40 and lens 102.

As another example, image processing may be used to ensure that the lens is not too far from the variable focus camera during the lens measurement operations. For example, if image processing detects an eyeglasses frame the user may be instructed to bring the lens closer to the variable focus camera.

If desired, an adjustable lens in head-mounted device 10 may be adjusted to match the performance of lens 102 without necessarily determining the optical power of lens 102. For example, in FIG. 8, steps 208-212 may be omitted. Instead, after step 206, the variable focus camera may capture images of the target through the tunable lens (e.g., tunable lens 72-2). The tunable lens 72-2 may be adjusted until the optical performance of tunable lens 72-2 matches the optical performance determined at step 206. In this way, tunable lens 72-2 is adjusted to match lens 102.

In FIG. 12, steps 314-318 may be omitted. Instead, after step 312, the variable focus camera may capture images of the targets through the tunable lens (e.g., tunable lens 72-2). The tunable lens 72-2 may be adjusted until the optical performance of tunable lens 72-2 matches the optical performance determined at steps 304, 308, and 312. In this way, tunable lens 72-2 is adjusted to match lens 102.

Some lenses such as progressive lenses, bifocal lenses, and trifocal lenses may have different portions with different associated optical powers. For these types of lenses, the lens may be characterized in at least two different portions of the lens to identify the optical powers associated with different portions.

Some lenses may have an associated prism correction. For these types of lenses, the prism offset may be detected using image processing. Electronic device 40 may output a notification regarding the prism offset in response to detecting the prism offset.

The examples in FIGS. 8 and 12 of performing lens measurement operations by capturing images of a target both with and without an intervening lens are merely illustrative. If desired, lens measurement operations (as in FIGS. 8 and/or 12) may be performed where images are only captured through the intervening lens. In other words, step 208 may be omitted in FIG. 8 and/or step 314 may be omitted in FIG. 12. When images are only captured through the intervening lens, depth sensor information from a depth sensor (e.g., a LIDAR sensor) in electronic device 40 may be used to measure the distance to the target in order to calculate the baseline spherical power. If the target is a planar surface, the same power may be assumed for all axes. In another possible arrangement, when the size and shape of the target is known, electronic device 40 may use target size and/or spatial frequency content (from the captured images) to detect distance to the target. In yet another possible arrangement, the electronic device 40 may be mounted at a known distance from the target. Using one or more of these techniques, the spherical power, cylindrical power, and cylindrical axis of a lens may be determined without needing to capture baseline images without the lens.

The example herein of electronic device 40 (with variable focus camera 46) measuring lens 102 and communicating with head-mounted device 10 is merely illustrative. If desired, head-mounted device 10 may itself include a variable focus camera. The head-mounted device may measure a lens using the variable focus camera (e.g., using the methods of FIGS. 8 and/or 12) and then adjust a tunable lens in the head-mounted device based on the measurements of the lens.

In some cases, electronic device 40 may have multiple variable focus cameras. Each camera may have a corresponding range of optical powers. For example, a first camera may have a first range of optical powers and a second camera may have a second range of optical powers that is greater than the first range. The first camera may be more accurate than the first camera but may only be able to test a smaller range of prescriptions than the second camera. Lens measurement operations may be attempted with the first (more accurate) camera and then repeated with the second camera if necessary (as one example).

The foregoing is merely illustrative and various modifications can be made to the described embodiments. The foregoing embodiments may be implemented individually or in any combination.

What is claimed is:

1. A method of operating an electronic device with a variable focus camera, the method comprising:
   while a lens is interposed between the variable focus camera and a target, capturing at least a first image of at least one target;
   determining first optical power information for the lens based on the at least first image;
   while the lens is not interposed between the variable focus camera and a target, capturing at least a second image of the at least one target;
   determining second optical power information for the lens based on the at least second image; and
   determining a spherical power, a cylindrical power, and a cylindrical axis for the lens using the first optical power information and the second optical power information.

2. The method defined in claim 1, wherein the at least one target comprises a single target and wherein determining first optical power information for the lens based on the at least first image comprises determining first optical power information for the lens based on one or more images of the single target.

3. The method defined in claim 2, wherein the single target comprises a plurality of concentric rings.

4. The method defined in claim 1, wherein capturing at least the first image of the at least one target comprises sweeping a focus of the variable focus camera between two optical powers using a plurality of discrete steps.

5. The method defined in claim 4, wherein determining the first optical power information for the lens based on the at least first image comprises:
   for each discrete step, determining respective focus scores for at least three meridians; and
   for each of the at least three meridians, determining a respective optical power of the variable focus camera associated with a respective peak focus score.

6. The method defined in claim 1, wherein the at least one target comprises first, second, and third targets.

7. The method defined in claim 6, wherein the first, second, and third targets are presented sequentially on a display that is external to the electronic device.

8. The method defined in claim 6, wherein the first target comprises horizontal stripes, wherein the second target comprises vertical stripes, and wherein the third target comprises diagonal stripes.

9. The method defined in claim 6, wherein determining the first optical power information for the lens based on the at least first image comprises:
   determining a first optimal optical power associated with the first target based on at least one image of the first target;
   determining a second optimal optical power associated with the second target based on at least one image of the second target; and determining a third optimal optical power associated with the third target based on at least one image of the third target.

10. The method defined in claim 9, wherein determining the first optimal optical power associated with the first target based on at least one image of the first target comprises performing autofocus operations for the variable focus camera while capturing the at least one image of the first target using the variable focus camera, wherein determining the second optimal optical power associated with the second target based on at least one image of the second target comprises performing autofocus operations for the variable focus camera while capturing the at least one image of the second target using the variable focus camera, and wherein determining the third optimal optical power associated with the third target based on at least one image of the third target comprises performing autofocus operations for the variable focus camera while capturing the at least one image of the third target using the variable focus camera.

11. The method defined in claim 1, wherein the electronic device comprises a display and wherein the method further comprises:
outputting information regarding at least one of the spherical power, the cylindrical power, and the cylindrical axis using the display.

12. The method defined in claim 1, further comprising:
based on at least one of the spherical power, the cylindrical power, and the cylindrical axis, outputting tuning information for a tunable lens in a head-mounted device.

13. The method defined in claim 12, wherein outputting the tuning information comprises wirelessly transmitting the tuning information to the head-mounted device.

14. The method defined in claim 1, further comprising:
based on at least one of the spherical power, the cylindrical power, and the cylindrical axis, identifying a removable lens element that is configured to be attached to a head-mounted device.

15. A method of operating an electronic device with a variable focus camera, the method comprising:
using the variable focus camera, capturing at least one image of at least one target through a lens;
using the at least one image of the at least one target, determining a first optimal optical power associated with a first meridian, a second optimal optical power associated with a second meridian, and a third optimal optical power associated with a third meridian; and
using the first, second, and third optimal optical powers, determining a spherical power, a cylindrical power, and a cylindrical axis for the lens.

16. The method defined in claim 15, further comprising:
using the variable focus camera, capturing at least one additional image of the at least one target without the lens interposed between the variable focus camera and the at least one target.

17. The method defined in claim 15, further comprising:
using the at least one additional image of the at least one target, determining a fourth optimal optical power associated with the first meridian, a fifth optimal optical power associated with the second meridian, and a sixth optimal optical power associated with the third meridian.

18. The method defined in claim 15, wherein determining the spherical power, the cylindrical power, and the cylindrical axis for the lens comprises determining a first difference between the first and fourth optimal optical powers, a second difference between the second and fifth optimal optical powers, and a third difference between the third and sixth optimal optical powers.

19. An electronic device, comprising:
a display;
a speaker;
a variable focus camera; and
control circuitry configured to:
use the variable focus camera to capture at least one image through an external lens;
using the at least one image, determine a spherical power, a cylindrical power, and a cylindrical axis for the lens; and
using at least one of the display and the speaker, output lens information based on the spherical power, the cylindrical power, and the cylindrical axis.

20. The electronic device defined in claim 19, wherein the lens information comprises an identity of a removable lens element for a head-mounted device.

* * * * *